United States Patent Office 2,776,991
Patented Jan. 8, 1957

2,776,991

N - ARALKYL - N - (2 - CARBAMYLALKYL) - HALOGENATED-ALKANAMIDES AND THEIR PREPARATION

Alexander R. Surrey, Albany, N. Y., assignor to Sterling Drug Inc., New York, N. Y., a corporation of Delaware No Drawing. Application December 27, 1954,
Serial No. 477,935

22 Claims. (Cl. 260—559)

This invention relates to N-aralkyl-N-(2-carbamylalkyl)-halogenated-alkanamides, to their preparation, and to certain intermediate N-(2-carbamylalkyl)-(substituted-phenyl)-alkylamines.

The N-aralkyl-N-(2-carbamylalkyl)-halogenated-alkanamides of my invention have the general formula

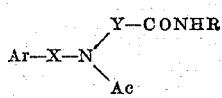

where Ar is a member selected from the group consisting of phenyl, naphthyl, biphenylyl, furyl, pyridyl and thienyl radicals, X is a lower alkylene radical having from one to four carbon atoms, Y is a lower alpha,beta-alkylene radical having from two to four carbon atoms, R is a member selected from the group consisting of hydrogen and a hydrocarbyl radical having from one to eight carbon atoms, and Ac is a halogenated-(lower alkanoyl) radical having from two to four carbon atoms. Chemotherapeutic evaluation of these compounds of my invention has shown them to possess amebacidal activity.

The radical Ar can have from one to three substituents such as halo, lower alkoxy, lower alkyl, lower alkylmercapto, lower alkylsulfonyl, nitro and di(lower alkyl)-amino. Furthermore, said substituents can be in any of the available positions of the Ar nucleus, and where more than one substituent, they can be the same or different and can be in any of the various position combinations relative to each other. The halo-substituents include chloro, bromo, iodo and fluoro. The lower alkoxy, lower alkyl, lower alkylmercapto and lower alkylsulfonyl substituents, and the lower alkyl radicals of said di(lower alkyl)amino substituent, have, in each alkyl thereof, preferably from one to six carbon atoms, and they include such substituents as: methoxy, ethoxy, methylenedioxy, ethylenedioxy, n-propoxy, isopropoxy, isobutoxy, n-amoxy, n-hexoxy, and the like, when lower alkoxy; methyl, ethyl, n-propyl, isopropyl, n-butyl, isobutyl, 2-butyl, n-amyl, n-hexyl, and the like, when lower alkyl; methylmercapto, ethylmercapto, n-propylmercapto, isobutylmercapto, n-hexylmercapto, and the like, when lower alkylmercapto; methylsulfonyl, ethylsulfonyl, n-propylsulfonyl, isobutylsulfonyl, n-hexylsulfonyl, and the like, when lower alkylsulfonyl; and dimethylamino, diethylamino, ethyl-methylamino, diisobutylamino, di-n-hexylamino, and the like, when di(lower alkyl)amino.

The lower alkylene radical X has from one to four carbon atoms, and includes such examples as $$-CH_2-, -CH_2CH_2-, -CH(CH_3)-, -C(CH_3)_2-, -CH_2CH_2CH_2-$$
$$-CH_2CH(CH_3), -CH_2CH_2CH_2CH_2-, -CH_2CH(CH_2CH_3)$$
$$-CH_2CH_2CH(CH_3)$$

and the like.

The lower alpha,beta-alkylene radical Y has from two to four carbon atoms, and includes such examples as $$-CH_2CH_2-, -CH(CH_3)CH_2-, -CH_2CHCH_3$$
$$-C(CH_3)_2CH_2-, -CH_2CH(CH_2CH_3)$$

and the like.

The hydrocarbyl radical R has from one to eight carbon atoms, and can be alkyl, alkenyl, cycloalkyl, cycloalkylalkyl, phenyl, alkylated-phenyl, benzyl or phenethyl, and includes such examples as: methyl, ethyl, n-propyl, isopropyl, 2-butyl, isoamyl, n-hexyl, and the like, when alkyl; 2-propenyl, 3-butenyl, 4-hexenyl, and the like, when alkenyl; cyclopropyl, cyclobutyl, cyclopentyl, cyclohexyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl.

The halogenated-(lower alkanoyl) radical Ac has from two to four carbon atoms, and includes such examples as chloroacetyl (chloroethanoyl), iodoacetyl, fluoroacetyl, dichloroacetyl (dichloroethanoyl), dibromoacetyl, trichloroacetyl, 2-chloropropanoyl (alpha-chloropropionyl), 3-bromopropanoyl, 2,2-diiodopropanoyl, 2-bromo-3-chloropropanoyl, 2,2-dichloropropanoyl, 2,2-difluoropropanoyl, 2,2,3-trichloropropanoyl (alpha,alpha,beta-trichloropropionyl), 2-chlorobutanoyl (alpha-chlorobutyryl), 3-bromobutanoyl, 2,2-dichlorobutanoyl, 3,4-dibromobutanoyl, 2,2,3-trichlorobutanoyl, 2,3,4-trichlorobutanoyl, and the like.

The compounds of my invention were prepared by reacting an N-(2-carbamylalkyl)-aralkylamine of the formula, Ar—X—NH—Y—CONHR, with an acylating agent selected from the group consisting of those having the formulas, Ac-halogen and (Ac)₂O, where Ar, X, Y, R and Ac have the meanings given above. When a halogenated-alkanoyl halide, Ac-halogen, was used, the halide halogen, i. e., the halo radical attached to the carbonyl function, was preferably chloro, however, the other halo radicals, i. e., bromo, iodo and fluoro also can be used. Illustrations of the process of my invention are: the preparation of N-(3,4-dichlorobenzyl)N-(2-carbamylethyl)-3,4-dichlorobenzylamine with dichloroacetyl chloride; the preparation of N-(2,4-dibromobenzyl)-N-(2-carbamylbutyl)-2,2-dichloropropanamide by reacting N-(2-carbamylbutyl)-2,4-dibromobenzylamine with 2,2-dichloropropanoyl chloride; the preparation of N-(4-nitrophenethyl) - N - (2-carbamylpropyl)-2,3-difluorobutanamide by reacting N-(2-carbamylpropyl)-4-nitrophenethylamine with 2,3-difluorobutanoic anhydride; and the preparation of N - (4 - n-butoxybenzyl)-N-[2-(ethylcarbamyl)ethyl]dibromoacetamide by reacting N-[2-(ethylcarbamyl)ethyl] - 4 - n - butoxybenzlamine with dichloroacetyl chloride. When a halogenated-alkanoic anhydride is used, the reaction can be carried out at room temperature or higher if necessary. When a halogenated-alkanoyl halide was used, the reaction was carried out preferably below room temperature, with chilling if necessary.

The intermediate N-(2-carbamylalkyl)-aralkylamines of the above given formula where R is hydrogen, i. e., Ar—X—NH—Y—CONH₂, were prepared by reacting an aralkylamine of the formula, Ar—X—NH₂, where Ar and X have the meanings given above, with a 2-alkenamide. This preparation was carried out, preferably, by: warming the reactance gently until solution was complete; allowing the reaction mixture to stand at room temperature from one to two weeks; dissolving the reaction mixture in an appropriate solvent, e. g., acetone; and treating the resulting solution with ethanolic hydrogen chloride to precipitate the N-(2-carbamylalkyl)-aralkylamine in the form of its hydrochloride. Illustrations of the preparation of these intermediate N-(2-carbamylalkyl)-aralkylamines, each in the form of its hydrochloride, are: the preparation of N-(2-carbamylethyl)-2,4-dichlorobenzylamine by reacting 2,4-dichlorobenzylamine with acrylamide; the preparation of N-(2-carbamylpropyl)-3,4,5-tribromobenzylamine by reacting 3,4,5-tribromobenzylamine with alpha-methylacrylamide; and the preparation of N-(2-carbamylbutyl)-4-nitrophenethylamine by reacting 4-nitrophenethylamine with alpha-ethylacrylamide.

The intermediate N-(2-carbamylalkyl)-aralkylamines of the above given formula where R is a hydrocarbyl radical, i. e., Ar—X—NH—Y—CONH-hydrocarbyl, were prepared by first reacting an aralkylamine of the formula, Ar—X—NH$_2$, where Ar and X have the meanings given above, with a lower alkyl ester (preferably the methyl ester) of a 2-alkenoic acid, and then reacting the resulting N-(2-carbalkoxyalkyl)-aralkylamine with a hydrocarbyl primary amine, RNH$_2$. Illustrations of this procedure are: the preparation of N[2-(ethylcarbamyl)ethyl]-2,4-dichlorobenzylamine by first reacting 2,4-dichlorobenzylamine with methyl acrylate and then reacting the resulting N-(2-carbomethoxyethyl)-2,4-dichlorobenzylamine with ethylamine; the preparation of N - [2 - (benzylcarbamyl)propyl] - 4 - n - butoxybenzylamine by first reacting 4-n-butoxybenzylamine with methyl alpha-methacrylate and then reacting the resulting N-(2 - carbomethoxypropyl) - 4 - n - butoxybenzylamine with benzylamine; the preparation of N-[2-(cyclohexylcarbamyl)butyl]-4-ethylmercaptophenethylamine by first reacting 4 - ethylmercaptophenethylamine with methyl alpha-ethylacrylate and then reacting the resulting N-(2 - carbomethoxybutyl) - 4 - ethylmercaptophenethylamine with cyclohexylamine.

Preferred embodiments of my invention are those N-(substituted - phenylalkyl) - N - (2 - carbamylalkyl) - halogenated-alkanamides having the formula

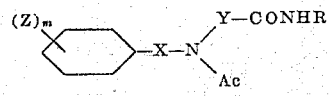

where X, Y, R and Ac have the meanings given above, Z is halo or lower alkoxy as defined above, and m is an integer from 1 to 3 inclusive. These substituted-phenylalkyl compounds having from one to three halo and/or lower alkoxy ring-substituents have been found by chemotherapeutic evaluation to have especially high amebacidal activities.

Also comprehended by my invention are the corresponding intermediate N-(2-carbamylalkyl)-(substituted-phenyl)alkylamines used to prepare my above-described preferred embodiments, these intermediates having the formula

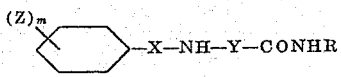

where X, Y, R, Z and m have the meanings given in the immediately preceding paragraph. These intermediates are disclosed and claimed in my copending divisional application Serial Number 537,552, filed September 29, 1955.

The following examples will further illustrate specific embodiments of the invention without, however, limiting it thereto.

EXAMPLE 1

A. N-(2-carbamylalkyl)-aralkylamines

The preparation of the intermediate N-(2-carbamylalkyl)-aralkylamines having the above formula where R is hydrogen is illustrated by the following preparation of N-(2-carbamylethyl)-4-chlorobenzylamine: A mixture of 28.3 g. of 4-chlorobenzylamine and 15.6 g. of acrylamide was warmed gently until solution was complete, and then left at room temperature for 7 days. The resulting solid was taken up in 400 ml. of acetone and 5 N ethanolic hydrogen chloride was added in 10 ml. portions. The precipitate was collected from each fraction before the following portion of acid was added. There was thus obtained two fractions weighing 15 g. and 9 g., respectively, which were combined and recrystallized twice from isopropanol, yielding the desired intermediate, N-(2-carbamylethyl)-4-chlorobenzylamine in the form of its hydrochloride, M. P. 220.1–221.2° C. (corr.).

Analysis.—Calcd. for C$_{10}$H$_{13}$ClN$_2$O.HCl: Cl$^-$, 14.24; N, 11.25. Found Cl$^-$, 14.33; N, 11.26.

Other N-(2-carbamylethyl)-aralkylamine hydrochlorides that were prepared following the procedure described above for the preparation of N-(2-carbamylethyl)-4-chlorobenzylamine hydrochloride using the appropriate aralkylamine and 2-alkenamide are given in Table I.

TABLE I

Q—⟨C$_6$H$_4$⟩—(CH$_2$)$_n$—NHCH$_2$CH$_2$CONH$_2$

| Q | n | M. P., °C.[a] | Hydrochloride M. P., °C. |
|---|---|---|---|
| H | 1 | 81–86 | 202–203. |
| 4-CH$_3$ | 1 | 98–103 | |
| 4-CH(CH$_3$)$_2$ | 1 | 69–72 | 217–218.8 (corr.). |
| 2,4-di-Cl | 1 | 65–75 | 164.5–166. |
| 4-OC$_4$H$_9$-n | 1 | 87–90 | 200–203. |
| 3,4-di-OCH$_3$ | 1 | | 218.9–220.8 (corr.). |
| 4-N(CH$_3$)$_2$ | 1 | (b) | |
| H | 2 | | 181.3–182.7 (corr.). |

[a] The free base form of these compounds was obtained by treating an aqueous solution of the hydrochloride with alkali, extracting the liberated base with benzene, removing the solvent by distilling in vacuo and recrystallizing the resulting N-(2-carbamylethyl)-aralkylamine from an appropriate solvent.
[b] This compound was used directly in the next step.

Other N-(2-carbamylalkyl)-aralkylamines are prepared according to the above procedure using the appropriate acrylamide or alkylated-acrylamide; such compounds include N - (2 - carbamylethyl) - 1 - naphthylmethylamine, N - (2 - carbamylethyl) - 1 - biphenylylmethylamine, N-(2 - carbamylethyl) - 4 - n - hexylbenzylamine, N - (2-carbamylethyl) - 2,4 - diiodobenzylamine, N - (2 - carbamylethyl) - 4 - nitrophenethylamine, N - (2 - carbamylpropyl) - 1 - (3,4,5 - triethoxyphenyl)ethylamine, N-(2 - carbamylpropyl) - 4 - (2,4-dichlorophenyl)butylamine, N - (2 - carbamylbutyl) - 4 - di - n - butylaminobenzylamine, N - (2 - carbamylethyl) - 4 - n - hexoxybenzylamine, N - (2 - carbamylethyl) - 4 - n - butylmercaptobenzylamine, N - (2 - carbamylethyl) - 4 - n - butylsulfonylbenzylamine, N - (2 - carbamylethyl) - 4 - nitrobenzylamine, N - (2 - carbamylethyl) - 2 - furylmethylamine, N - (2 - carbamylethyl) - 2 - thienylmethylamine, N - (2 - carbamylethyl) - 2 - pyridylmethylamine, N - (2-carbamylethyl) - 3 - pyridylmethylamine, N - (2 - carbamylpropyl) - 5 - chloro - 2 - pyridylmethylamine, and the like.

B. N-aralkyl-N-(2 - carbamylalkyl)-halogenated-alkanamides

These halogenated-alkanamides were prepared by reacting an N-(2-carbamylalkyl)-aralkylamine with an acylating agent selected from the group consisting of those having the formulas, Ac-halogen and (Ac)$_2$O, where Ac has the meaning given above. There follows an illustration of such a preparation using a halogenated-alkanoyl halide, Ac-halogen: A mixture of 12.4 g. of N-(2-carbamylethyl)-2,4-dichlorobenzylamine, 85 ml. of 1 N sodium hydroxide solution and 80 ml. of ethylene dichloride was cooled below 0° C. while a solution of 7.5 g. of dichloroacetyl chloride in 30 ml. of ethylene dichloride was added slowly with stirring. After the addition had been completed, the stirring was continued while the mixture was allowed to warm up to room temperature. The ethylene dichloride layer was separated, washed twice with 2 N hydrochloric acid and once with water. The washed solution was then dried over anhydrous potassium carbonate and the ethylene dichloride was removed by distilling under reduced pressure, leaving a solid residue. This solid was recrystallized twice from isopropanol, yielding the product, N-(2-carbamylethyl)-N-(2,4-dichlorobenzyl)-dichloroacetamide, M. P. 124.7–127.0° C. (corr.).

Analysis.—Calcd. for $C_{12}H_{13}Cl_4N_2O_2$: C, 40.24; H, 3.38; Cl, 39.61. Found: C, 40.29; H, 3.27; Cl, 39.55.

The same product, N-(2-carbamylethyl)-N-(2,4-dichlorobenzyl)dichloroacetamide, is prepared by reacting N-(2-carbamylethyl)-2,4-dichlorobenzylamine with dichloroacetic anhydride instead of dichloroacetyl chloride.

Other N-phenylalkyl-N-(2-carbamylethyl)dichloroacetamides that were prepared following the procedure described above for the preparation of N-(2-carbamylethyl)-N-(2,4-dichlorobenzyl)dichloroacetamide, using the appropriate N-(2-carbamylethyl)benzylamine and acylating agent, e. g., dichloroacetyl chloride, are given in Table II.

TABLE II

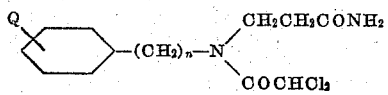

| Q | n | M. P., ° C. (corr.) |
|---|---|---|
| H | 1 | 83.9–89.2. |
| 4-CH₃ | 1 | 118.3–120.9. |
| 4-OC₄H₉-n | 1 | 89.4–91.3. |
| 4-CH(CH₃)₂ | 1 | 68.1–71.1. |
| 3,4-di-OCH₃ | 1 | 157.2–159.4. |
| 4-Cl | 1 | 99.0–101.2. |
| 4-N(CH₃)₂ | 1 | 107.5–110 (uncorr.). |
| H | 2 | 111.6–120.3. |

Other N - aralkyl-N-(2-carbamylalkyl) - halogenated-alkanamides that are prepared according to the above procedure used to prepare N-(2,4-dichlorobenzyl)-N-(2-carbamylethyl)dichloroacetamide using the appropriate N-(2-carbamylalkyl)-aralkylamine and halogenated-alkanoylating agent include the following: N-(1-naphthylmethyl) - N - (2-carbamylethyl)dichloroacetamide, N-(1-biphenylylmethyl) - N - (2-carbamylethyl)dichloroacetamide, N-(4 - n - hexylbenzyl)-N-(2-carbamylethyl)dibromoacetamide, N-(2,4 - diiodobenzyl)-N-(2-carbamylethyl)bromochloroacetamide, N-(4-nitrophenethyl)-N-(2-carbamylethyl)diiodoacetamide, N - [1-(3,4,5-triethoxyphenyl)ethyl]-N-(2 - carbamylpropyl)dichloroacetamide, N-[4-(2,4-dichlorophenyl)butyl] - N - (2-carbamylpropyl)-2,2-dichloropropanamide, N-(4-di-n-butylaminobenzyl) - N - (2-carbamylbutyl)-2,2-diiodopropanamide, N-(4-n-hexoxybenzyl) - N - (2-carbamylethyl)-2-bromo-3-chloropropanamide, N-(4-n-butylmercaptobenzyl) - N - (2-carbamylethyl)-2,2,3-trichloropropanamide, N - (4-n-butylsulfonylbenzyl) - N - (2-carbamylethyl)-2,2-dichlorobutanamide, N-(2,4-dichlorobenzyl) - N - (2-carbamylethyl)-3,4-dibromobutanamide, N-(4-n-butoxybenzyl)-N-(2-carbamylethyl)-2,2,3-trichlorobutanamide, N - (4-chlorobenzyl) - N - (2-carbamylethyl)-2,3,4-trichlorobutanamide, N - (2-furylmethyl)-N-(2-carbamylethyl)dichloroacetamide, N-(2-thienylmethyl) - N - (2-carbamylethyl)dichloroacetamide, N - (2-pyridylmethyl) - N - (2-carbamylethyl)dichloroacetamide, N - (3-pyridylmethyl)-N-(2 - carbamylethyl)dichloroacetamide, N - (5-chloro-2-pyridylmethyl) - N - (2 - carbamylpropyl)dichloroacetamide, and the like.

EXAMPLE 2

*N-aralkyl-N-(2 - carbamylalkyl)trihaloacetamides*

These trihaloacetamides were prepared by reacting an N-(2-carbamylalkyl)-aralkylamine with a trihaloacetylating agent, including a trihaloacetyl halide or a trihaloacetic anhydride. This preparation is illustrated by the following preparation of N-(4-n-butoxybenzyl)-N-(2-carbamylethyl)trichloroacetamide using trichloroacetyl chloride: A mixture of 14.3 g. of N-(2-carbamylethyl)-4-n-butoxy-benzylamine hydrochloride, 130 ml. of 1 N sodium hydroxide solution and 130 ml. of ethylene dichloride was cooled below 5° C. while a solution of 10.9 g. of trichloroacetyl chloride in 30 ml. of ethylene dichloride was added slowly with stirring. After the addition had been complete, the stirring was continued while the mixture was allowed to warm up to room temperature. The ethylene dichloride layer was separated, washed twice with 2 N hydrochloric acid and once with water. The solution was dried over anhydrous potassium carbonate and the solvent evaporated under reduced pressure, thereby leaving about 8 g. of an oil which solidified on standing. This solid was recrystallized from benzene-n-pentane, yielding the product, N-(4-n-butoxybenzyl)-N-(2-carbamylethyl)trichloroacetamide, M. P. 113.0–114.5° C. (corr.).

Analysis.—Calcd. for $C_{16}H_{21}Cl_3N_2O_3$: N, 7.08; $Cl_{DC}$, 26.89. Found N, 7.02; $Cl_{DC}$, 26.27.

Also prepared according to the foregoing procedure were N - (4-chlorobenzyl)-N-(2-carbamylethyl)trichloroacetamide, M. P. 143–145° C. [Analysis.—Calcd. for $C_{12}H_{12}Cl_4N_2O_2$: $Cl_{DC}$, 39.61. Found: $Cl_{DC}$, 39.40]; N-benzyl-N-(2 - carbamylethyl)trichloroacetamide, M. P. 111.7–113.6° C. (corr.) [Analysis.—Calcd. for

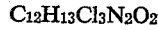

$C_{12}H_{13}Cl_3N_2O_2$

Cl, 32.87; N, 8.66. Found: Cl, 33.15; N, 8.74]; and N-phenylethyl - N - (2-carbamylethyl)trichloroacetamide, M. P. 106–107.5° C. [Analysis.—Calcd. for

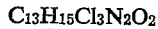

$C_{13}H_{15}Cl_3N_2O_2$

N, 8.30. Found: N, 7.93].

Other N-aralkyl-N-(2-carbamylalkyl)trihaloacetamides that are prepared according to the above procedure using the appropriate N-(2-carbamylalkyl)-aralkylamine and trihaloacetylating agent include the following: N-(2,4-dichlorobenzyl)-N-(2-carbamylethyl)trichloroacetamide, N-(4-isopropylbenzyl)-N - (2-carbamylethyl)trichloroacetamide, N-(3,4-dibromobenzyl)-N-(2 - carbamylpropyl)tribromoacetamide, N-(4-isobutylbenzyl)-N-(2-carbamylbutyl)trichloroacetamide, N - (3,4,5-triiodobenzyl)-N-(2-carbamylethyl)trichloroacetamide, N-(2,4-dichlorophenethyl)-N-(2-carbamylethyl)trichloroacetamide, and the like.

EXAMPLE 3

*N-aralkyl-N-(2-carbamylalkyl) monohaloalkanamides*

These monohaloalkanamides were prepared by reacting an N-(2-carbamylalkyl)-aralkylamine with a monohaloalkanoylating agent including a monohaloalkanoyl halide or a monhaloalkanoic anhydride. This method is illustrated by the following preparation of N-(4-isopropylbenzyl)-N-(2-carbamylethyl)chloroacetamide using chloroacetyl chloride. A mixture of 10 g. of N-(2-carbamylethyl)-4-isopropylbenzylamine hydrochloride, 125 ml. of 1 N sodium hydroxide solution and 100 ml. of ethylene dichloride was cooled below 5° C. while a solution of 6.2 g. of chloroacetyl chloride in 50 ml. of ethylene dichloride was added slowly with stirring. After the addition had been completed, the stirring was continued while the mixture was allowed to warm up to room temperature. The ethylene dichloride layer was separated, washed twice with 2 N hydrochloric acid and once with water. The solution was dried and the solvent evaporated under reduced pressure, thereby leaving about 9.5 g. of a solid. This solid was recrystallized from a solvent mixture of 3 parts of isopropanol and 1 part of water, yielding the product, N-(4-isopropylbenzyl)-N-(2-carbamylethyl)chloroacetamide, M. P. 78.3–80.7° C. (corr.).

Analysis.—Calcd. for $C_{15}H_{21}ClN_2O_2$: N, 9.44; Cl, 11.95. Found: N, 9.64; Cl, 11.85.

Also prepared according to the foregoing procedure was N - (4 - chlorobenzyl) - N - (2 - carbamylethyl)chloroacetamide, M. P. 101.2–102.8° C. (corr.) [Analysis.—Calcd. for $C_{12}H_{14}Cl_2N_2O_2$: Cl, 24.51; N, 9.69. Found: Cl, 24.60; N, 9.76].

Other N-aralkyl-N-(2-carbamylalkyl)monohalo-alkanamides that are prepared according to the above procedure, using the appropriate N-(2-carbamylalkyl)-aralkylamine and a monohaloalkanoylating agent, include the following: N-2,4-dichlorobenzyl)-N-(2-carbamylethyl)chloroacetamide, N-(3,4-dimethoxybenzyl)-N-(2-carbamylethyl)-3-chloropropanamide, N-(4-n-butoxybenzyl)-N-(2-carbamylethyl)-4-bromobutanamide, N-(3,4-dibromobenzyl)-N-(2-carbamylethyl)bromoacetamide, N-(4-n-hexylbenzyl)-N-(2-carbamylbutyl)fluoroacetamide, N-(2,4-diiodobenzyl)-N-(2-carbamylpropyl)iodoacetamide, N-(2,4-dichlorophenethyl)-N-(2-carbamylethyl)chloroacetamide, and the like.

EXAMPLE 4

A. N-(2-carbalkoxyalkyl)-aralkylamines

The preparation of these intermediate N-(2-carbalkoxyalkyl)-aralkylamines is illustrated by the following preparation of N-(2-carbomethoxyethyl)-4-isopropylbenzylamine: To 43 g. of methyl acrylate was added 60 g. of 4-isopropylbenzylamine with stirring and occasional cooling, keeping the temperature below 35° C. The reaction mixture was then allowed to stand for one week at room temperature. The excess methyl acrylate was removed by distilling under reduced pressure and the residual material distilled in vacuo. The fraction boiling at 115–135° C. at 0.3 mm. was the desired product, N-(2-carbomethoxyethyl)-4-isopropylbenzylamine, $n_D^{25}$, 1.5030.

Analysis.—Calcd. for $C_{14}H_{21}NO_2$: $N_{AP}$, 5.95. Found: $N_{AP}$, 5.92.

Here $N_{AP}$ means basic nitrogen content as determined by acetic acid-perchloric acid titration.

Other N-(2-carbalkoxyalkyl)-aralkylamines that are prepared according to the above procedure are: N-(2-carbethoxyethyl)-2,4-dichlorobenzylamine, N-(2-carbomethoxypropyl)-4-n-butoxybenzylamine, N-(2-carbomethoxybutyl)-3,4-diethoxybenzylamine, N-(2-carbomethoxyethyl)-4-n-hexylbenzylamine, and the like.

B. N-[2-(hydrocarbyl-carbamyl)alkyl]-aralkylamines

The preparation of these intermediate compounds is illustrated by the following preparation of N-[2-(ethylcarbamyl)ethyl]-4-isopropylbenzylamine: A mixture of 23.5 g. of N-(2-carbomethoxyethyl)-4-isopropylbenzylamine, 45.1 g. of anhydrous ethylamine and 50 ml. of ethanol were left tightly stoppered at room temperature for five days. The solvent and excess ethylamine were removed by distilling under reduced pressure, and the resulting viscous red oil was distilled. The fraction boiling at 135–148° C. at 1 micron, $n_D^{25}$, 1.5204, was the desired product, N-[2-(ethylcarbamyl)ethyl]-4-isopropylbenzylamine.

Analysis.—Calcd. for $C_{15}H_{24}N_2O$: $N_{AP}$, 5.62. Found: $N_{AP}$, 5.64.

Following the above procedure but substituting for ethylamine, n-hexylamine, allylamine, cyclopentylamine, cyclohexylmethylamine, aniline, 3-ethylaniline, benzylamine or phenethylamine, and using the appropriate N-(2-carbalkoxyalkyl)-aralkylamine, the following products are obtained: N-[2-(n-hexylcarbamyl)ethyl]-4-isopropylbenzylamine, N-[2-(allylcarbamyl)ethyl]-2,4-dichlorobenzylamine, N-[2-(cyclopentylcarbamyl)propyl]-4-n-butoxybenzylamine, N-[2-(cyclohexylmethylcarbamyl)ethyl]-3,4-dibromobenzylamine, N-[2-(phenylcarbamyl)butyl]-4-chlorobenzylamine, N-[2-(3-ethylphenylcarbamyl)ethyl]-2-(3,4-diethoxyphenyl)ethylamine, N-[2-(benzylcarbamyl)ethyl]-2,4-dichlorobenzylamine or N-[2-phenethylcarbamyl)ethyl]-4-nitrobenzylamine, C. N-aralkyl-N-[2-(hydrocarbyl-carbamyl)alkyl]-halogenated-alkanamides These N,N-disubstituted-halogenated-alkanamides were prepared by reacting an N-[2-(hydrocarbyl-carbamyl)alkyl]-aralkylamine with an acylating agent selected from the group consisting of those having the formula Ac-halogen and (Ac)₂O, where Ac has the meaning given above. There follows an illustration of such a preparation using a halogenated-alkanoyl halide, Ac-halogen: A mixture of 11 g. of N-[2-(ethylcarbamyl)ethyl]-4-isopropylbenzylamine, 60 ml. of 1 N sodium hydroxide solution and 75 ml. of ethylene dichloride was cooled below 5° C. while a solution of 7.4 g. of dichloroacetyl chloride in 25 ml. of ethylene dichloride was added slowly with stirring. After the addition had been completed, the stirring was continued while allowing the mixture to warm up to room temperature. The ethylene dichloride layer was separated, washed twice with 2 N hydrochloric acid and once with water; the solution was then treated with decolorizing charcoal, filtered, the filtrate dried, and the solvent removed by distilling under reduced pressure. There remained a viscous, red oil that weighed 14 g. after drying at 70° C. at 0.3 mm. for one hour. This non-distillable oil is the desired product, N-(4-isopropylbenzyl)-N-[2-(ethylcarbamyl)ethyl]-dichloroacetamide.

Analysis.—Calcd. for $C_{17}H_{24}Cl_2N_2O_2$: Cl, 19.73; N, 7.80. Found: Cl, 19.60; N, 7.65.

Other N-aralkyl-N-[2-(hydrocarbyl-carbamyl)alkyl]-halogenated-alkanamides that are prepared according to the above procedure include the following: N-(4-isopropylbenzyl)-N-[2-(n-hexylcarbamyl)ethyl]-dibromoacetamide, N-(2,4-dichlorobenzyl)-N-[2-(allylcarbamyl)ethyl]trichloroacetamide, N-(4-n-butoxybenzyl)-N-[2-(cyclopentylcarbamyl)propyl]-iodoacetamide, N-(3,4-dibromobenzyl)-N-[2-(cyclohexylmethylcarbamyl)ethyl]-2,2-dichloropropanamide, N-(4-chlorobenzyl)-N-[2-(phenylcarbamyl)butyl]-2,3-dichloropropanamide, N-[2-(3,4-diethoxyphenyl)ethyl]-N-[2-(3-ethylphenylcarbamyl)ethyl]-2,3,4-trichlorobutanamide, N-(2,4-dichlorobenzyl)-N-[2-(benzylcarbamyl)ethyl]-2,2-dibromobutanamide, N-(4-nitrobenzyl)-N-[2-phenethylcarbamyl)ethyl]dichloroacetamide, and the like.

The N-aralkyl-N-(2-carbamylalkyl)-halogenated-alkanamides of the foregoing examples when administered orally by stomach tube to hamsters infected with Endamoeba criceti were found to completely clear the animals at drug levels of about 5 to 200 mg. per kg. of body weight. Some of the compounds have $ED_{50}$ values below 100 mg. per kg. of body weight, $ED_{50}$ meaning the effective dose necessary to clear 50% of the hamsters of the amebic infection; illustrations of such compounds and their approximate $ED_{50}$ values given in parentheses are: N-(2,4-dichlorobenzyl)-N-(2-carbamylethyl)dichloroacetamide (5), N-benzyl-N-(2-carbamylethyl)dichloroacetamide (60), N-(4-methylbenzyl)-N-(2-carbamylethyl)dichloroacetamide (65), N-(4-n-butoxybenzyl)-N-(2-carbamylethyl)dichloroacetamide (35), N-(4-isopropylbenzyl)-N-(2-carbamylethyl)dichloroacetamide (80), N-(4-chlorobenzyl)-N-(2-carbamylethyl)dichloroacetamide (40), N-(3,4-dimethoxybenzyl)-N-(2-carbamylethyl)dichloroacetamide (15) and N-(4-n-butoxybenzyl)-N-(2-carbamylethyl)trichloroacetamide (15). The compounds can be administered in aqueous suspension or, alternatively, by incorporation with feed.

I claim:
1. A compound having the formula

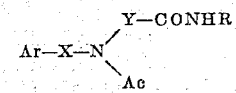

where Ar is a member selected from the group consisting or phenyl, naphthyl, biphenylyl, furyl, pyridyl and thienyl-radicals and such radicals substituted by from one to three substituents selected from the group consisting of halo, lower alkoxy, lower alkyl, lower alkylmercapto, lower alkylsulfonyl, nitro and di(lower alkyl)amino, X is a lower alkylene radical having from one to four carbon atoms, Y is a lower alpha,beta-alkylene radical having from two to four carbon atoms, R is a member selected from the group consisting of hydrogen and a hydrocarbyl radical having from one to eight carbon atoms, and Ac is a halogenated-(lower alkanoyl) radical having from two to four carbon atoms.

2. A compound having the formula

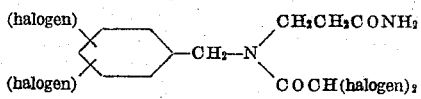

3. A compound having the formula

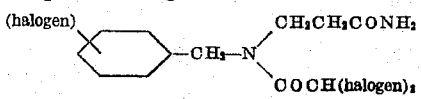

4. A compound having the formula

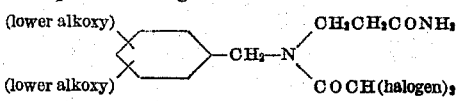

5. A compound having the formula

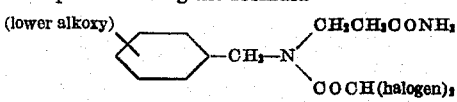

6. A compound having the formula

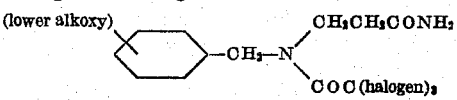

7. N - (2 - carbamylethyl) - N - (2,4 - dichlorobenzyl) dichloroacetamide.

8. N - (2 - carbamylethyl) - N - (4 - chlorobenzyl) dichloroacetamide.

9. N - (2 - carbamylethyl) - N - (3,4 - dimethoxybenzyl) dichloroacetamide.

10. N - (2 - carbamylethyl) - N - (4 - n - butoxybenzyl) dichloroacetamide.

11. N - (2 - carbamylethyl) - N - (4 - n - butoxybenzyl) trichloroacetamide.

12. A process for the preparation of a compound having the formula

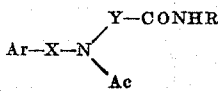

where Ar is a member selected from the group consisting of phenyl, naphthyl, biphenylyl, furyl, pyridyl and thienyl radicals and such radicals substituted by from one to three substituents selected from the group consisting of halo, lower alkoxy, lower alkyl, lower alkylmercapto, lower alkylsulfonyl, nitro and di(lower alkyl)amino, X is a lower alkylene radical having from one to four carbon atoms, Y is a lower alpha,beta-alkylene radical having from two to four carbon atoms, R is a member selected from the group consisting of hydrogen and a hydrocarbyl radical having from one to eight carbon atoms, and Ac is a halogenated(lower alkanoyl) radical having from two to four carbon atoms, which comprises reacting a compound having the formula, Ar—X—NH—Y—CONHR, with an acylating agent selected from the group consisting of those having the formula Ac-halogen and (Ac)₂O.

13. A process for the preparation of a compound having the formula

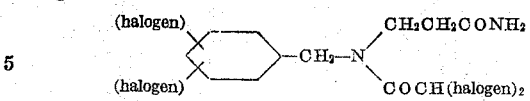

which comprises reacting the corresponding N-(2-carbamylethyl)di-halobenzylamine with a dihaloacetyl halide.

14. A process for the preparation of a compound having the formula

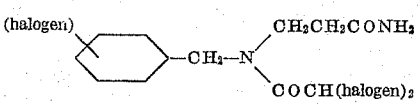

which comprises reacting the corresponding N-(2-carbamylethyl)halobenzylamine with a dihaloacetyl halide.

15. A process for the preparation of a compound having the formula

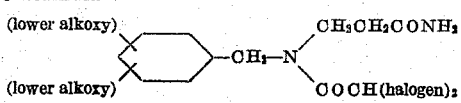

which comprises reacting the corresponding N-(2-carbamylethyl)di-alkoxybenzylamine with a dihaloacetyl halide.

16. A process for the preparation of a compound having the formula.

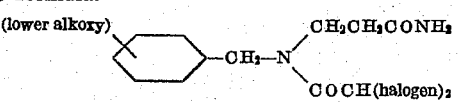

which comprises reacting the corresponding N-(2-carbamylethyl)alkoxybenzylamine with a dihaloacetyl halide.

17. A process for the preparation of a compound having the formula

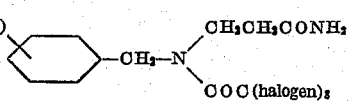

which comprises reacting the corresponding N-(2-carbamylethyl)alkoxybenzylamine with a trihaloacetyl halide.

18. A process for the preparation of N-(2-carbamylethyl)-N-(2,4-dichlorobenzyl)dichloroacetamide which comprises reacting N-(2-carbamylethyl)-2,4-dichlorobenzylamine with dichloroacetyl chloride.

19. A process for the preparation of N-(2-carbamylethyl)-N-(4-chlorobenzyl)dichloroacetamide which comprises reacting N-(2-carbamylethyl)-4-chlorobenzylamine with dichloroacetyl chloride.

20. A process for the preparation of N-(2-carbamylethyl)-N-(3,4-dimethoxybenzyl)dichloroacetamide which comprises reacting N-(2-carbamylethyl)-3,4-dimethoxybenzylamine with dichloroacetyl chloride.

21. A process for the preparation of N-(2-carbamylethyl) - N - (4-n - butoxybenzyl)dichloroacetamide which comprises reacting N-(2-carbamylethyl)-4-n-butoxybenzylamine with dichloroacetyl chloride.

22. A process for the preparation of N-(2-carbamylethyl) - N - (4-n-butoxybenzyl)trichloroacetamide which comprises reacting N-(2-carbamylethyl)-4-n-butoxybenzylamine with trichloroacetyl chloride.

References Cited in the file of this patent
UNITED STATES PATENTS

| | | |
|---|---|---|
| 2,269,147 | Dickey et al. | Jan. 6, 1942 |
| 2,312,896 | Graenacher et al. | Mar. 2, 1943 |
| 2,317,999 | Leuchs | May 4, 1943 |
| 2,441,498 | Lofgren et al. | May 11, 1948 |